(12) United States Patent
Guygaew

(10) Patent No.: US 9,738,185 B1
(45) Date of Patent: Aug. 22, 2017

(54) SYSTEM AND METHOD FOR PROVIDING A SUBSTANTIALLY HORIZONTAL RESTING AREA IN PASSENGER VEHICLES

(71) Applicant: Wudthipong Guygaew, Cambridge, MA (US)

(72) Inventor: Wudthipong Guygaew, Cambridge, MA (US)

( * ) Notice: Subject to any disclaimer, the term of this patent is extended or adjusted under 35 U.S.C. 154(b) by 836 days.

(21) Appl. No.: 13/762,503

(22) Filed: Feb. 8, 2013

(51) Int. Cl.
*B60N 2/34* (2006.01)

(52) U.S. Cl.
CPC ........................ *B60N 2/34* (2013.01)

(58) Field of Classification Search
USPC ................. 297/63, 64, 66, 354.12, 354.13
See application file for complete search history.

(56) References Cited

U.S. PATENT DOCUMENTS

| | | | | |
|---|---|---|---|---|
| 1,725,807 A | * | 8/1929 | Leutz | 297/66 |
| 2,309,445 A | * | 1/1943 | Edwards | 297/354.13 |
| 2,576,343 A | * | 11/1951 | Hibbard et al. | 297/65 |
| 4,065,174 A | * | 12/1977 | Yokohama et al. | 297/66 |
| 4,487,451 A | | 12/1984 | Fiorini | |
| 5,954,398 A | | 9/1999 | Namba et al. | |
| 7,025,420 B2 | | 4/2006 | Guinea Pena et al. | |
| 7,240,949 B1 | | 7/2007 | Moushegian et al. | |
| 7,281,760 B2 | * | 10/2007 | Braitmaier et al. | 297/64 |
| 2007/0057557 A1 | * | 3/2007 | Moon | 297/354.13 |
| 2009/0026824 A1 | | 1/2009 | Yoshida | |
| 2012/0139316 A1 | | 6/2012 | Ohnishi | |

* cited by examiner

*Primary Examiner* — Philip Gabler
(74) *Attorney, Agent, or Firm* — Stan Collier, Esq.

(57) ABSTRACT

A seating arrangement provides a relatively flat surface in the seating area of passenger vehicles to rest. The present invention allows the passenger to remain in the seat and be able to rest on a fully inclined seat providing a flat horizontal surface. In one embodiment, the back seat cushion(s) can be removable and thus the front seat backs rest upon the same platform support as the back seat cushions. In a second embodiment, the rear seat cushions have removable rear seat cushion sections to allow the front backs to fully recline into a horizontal position in the open voids formed after the headrest is removed. In a third embodiment applicable to the first two embodiments, the rear seat backs can be removed to extend the resting area into the trunk. In a fourth embodiment second row seats are fully reclinable onto the third row seats.

16 Claims, 8 Drawing Sheets

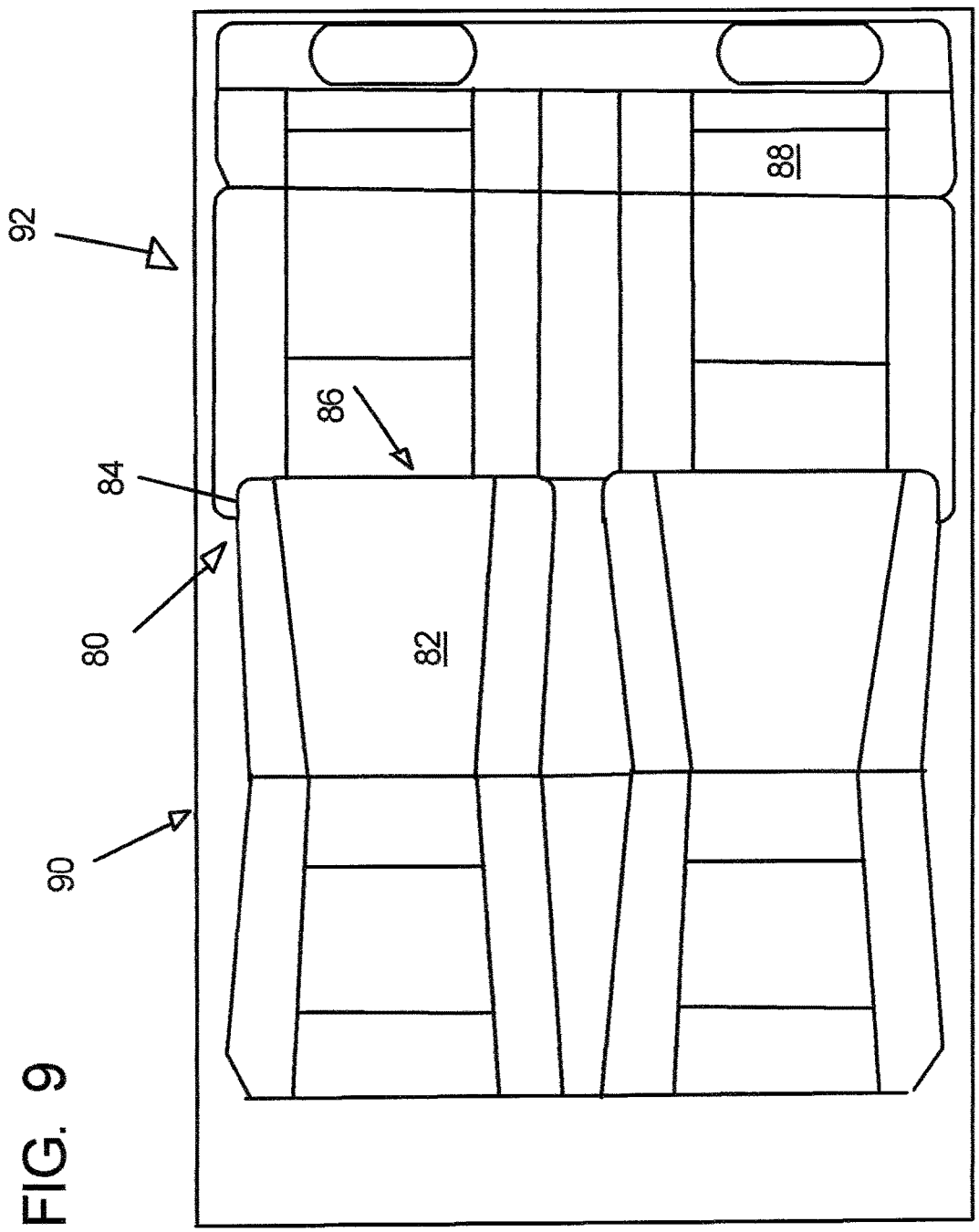

SYSTEM AND METHOD FOR PROVIDING A SUBSTANTIALLY HORIZONTAL RESTING AREA IN PASSENGER VEHICLES

CROSS-REFERENCES TO RELATED APPLICATIONS

NA

REFERENCE TO FEDERALLY SPONSORED RESEARCH OR DEVELOPMENT

NA

REFERENCE TO JOINT RESEARCH AGREEMENTS

NA

REFERENCE TO SEQUENCE LISTING

NA

BACKGROUND OF THE INVENTION

Field of the Invention

The present invention relates generally to passenger vehicles, and, particularly, relates to front seating in the passenger vehicles, and, in greater particularly, relates to a system and method for allowing persons to fully recline the front seats to allow for rest in smaller passenger vehicles classified as subcompact or compact, in particular.

Description of the Prior Art

The modern passenger vehicle has decreased in length considerably over the last 30 years. The main reason for this action has been the demand by the US government to meet higher fuel standards. Unfortunately, one of the prices paid is the lack of space within the interior seating area. Although the front seats have adjustable slides, insufficient space exists behind the seats to allow the seat backs to fully recline to provide a sleeping area or rest area. This is especially true in subcompact and compact vehicles. In these vehicles the front seat back may recline, but it is blocked from fully reclining by the back seat cushions.

An exception to this is the Honda Element® EX (out of production in 2012) and the Kia Soul®. In particular, the front seat is moved forward greatly to allow the front seat back to fold back without hitting the rear cushion when the headrest is removed. In this position, ample leg room does not exist so one would have to be laying on this flat area with the legs up on the flat area, but this vehicle is not a subcompact or compact vehicle as such, but a variant to provide a vehicle like a small station wagon. In much older vehicles, the amount of space between the front seat and the back seat allowed the front seat back to be folded back and down and such a car seat is shown in U.S. Pat. No. 4,487,451.

Other US Patents such as U.S. Pat. No. 5,954,398 disclose a car seating arrangement where the back seat cushion folds down into the rear foot well. Then the front seat back is folded down flat on top of the stored back seat cushion. The front seat back is also folded down onto the back seat cushion for support.

U.S. Pat. No. 7,025,420 discloses a mechanism to allow the front seat back to fold down to provide a flat surface. U.S. Pat. No. 7,240,949 discloses a vehicle seating design where both the front and back seat back fold forward to provide a flat surface. U.S. Patent Application 2009/0026824 discloses another mechanism for allowing the front seat back to fold backwards to form a full-flat surface. U.S. Patent Application 2012/0139316 discloses another mechanism for allowing the front seat back to fold backwards. All of the above patents, patent applications and items included herein and in the Information Disclosure Statement are incorporated by reference.

Accordingly, there is a need for a system and method for allowing seats in a passenger vehicle to be positioned as a flat surface for resting.

SUMMARY OF THE INVENTION

Being able to rest in a car is a desirable feature when you are on a long trip or have children, but with today's cars, limited space makes this very difficult.

The present invention provides a relatively flat horizontal surface in the seating area for passengers to relax and/or rest. Today's cars have been downsized very significantly as compared to vehicles in the 70s and 80s. Today's cars range in class size from subcompact, compact, mid-size, and full size. The present invention allows the passenger to remain in the seat and optionally be able to relax and/or rest on an inclined seat and/or on a flat surface. Due to the reduced size of cars, typical front seat backs only recline to a degree because the front seat back hits the rear seat cushion. The present invention allows the front seat backs to fully recline to a flat position. In one embodiment, a removable back seat cushion can be easily removable and thus the front seat backs rest upon the same support frame as the back seat cushions. In a second embodiment, the rear seat cushions have removable rear seat cushion sections to allow the front backs to fully recline into the open/void sections after the headrests are removed. In a third embodiment applicable to the first two embodiments, the rear seat backs can also be removed to extend the resting area into the trunk area. Therefore to implement this invention, front seat backs must be able to fully recline to a flat position without moving the seat forward greatly and the rear seat cushion must be easily removable or have removable sections. These may be storable in the rear foot well.

The present invention can be further used in passenger vehicles having two rows of back seats such as in a SUV/van/mini-van where the larger seat backs, for seating two or more persons, can fully recline and be positioned in a void formed by a removable seat cushion.

An object of the present invention is to provide a rest area in a vehicle where the rest area is essentially flat.

It is another object of the present invention to provide a seating arrangement where the hinge in the front seat requires no further strengthening since the back seat when fully reclined rests upon the rear seat frame.

It is a further object of the present invention to provide a seating arrangement where the back seat cushions are quickly and easily removed.

It is still a further object of the present invention to provide a seating arrangement where the rear seat cushion has removable rear seat cushion sections for accepting the top back of the front seat into the void so formed.

It is yet a further object of the present invention to provide a seating arrangement where the back seats backs can be removed to increase the area for resting.

It is yet a further object of the present invention to provide a seating arrangement for resting especially for subcompact and/or compact vehicles.

It is yet a further object of the present invention to provide a seating arrangement for resting in vehicles having 2 or more rows of seats such as in a SUV, van or mini-van where the seats of one row may be separately reclineable, or joined together to recline onto seat cushions behind.

These and other objects, features, and advantages of the present invention will become more readily apparent from the attached drawings and the detailed description of the preferred embodiments, which follow.

BRIEF DESCRIPTION OF THE DRAWINGS

FIG. 9 illustrates the present invention being used on a SUV/van/mini-van seating arrangement having a second row bench type seats and a third row bench type seats.

Like reference numerals refer to like parts throughout the several views of the drawings.

DETAILED DESCRIPTION OF THE PREFERRED EMBODIMENTS

Having a relatively flat resting area in today's vehicles is almost impossible unless there is a special design of the vehicle to accept fully reclining seats. Being able to rest in a car is a desirable feature when you are on a long trip or have children who like to lay down, but with today's passenger vehicles, limited space makes this very difficult.

The traditional large family station wagon of the 50s, 60s, and 70s has gone the way of the dinosaur, and has been replaced by the van and/or mini-van where the back seats have front reclining seat backs. The front seat backs do not fully recline into a horizontal position. Although you have a resting area in the rear area, the price of these vehicles ranges from mid-30s to 50 thousand dollars thus limiting its availability. Manufacturers have attempted to address this issue by developing special vehicles like the Honda Element® (now out of production) where the front seat has a much longer sliding rail so that when the seat back is fully reclined backwards it does not touch the rear seat. The problem with this arrangement is that the seat back is not resting on the rear seat area, but over the foot well so the hinging arrangement must be heavy duty so that the seat back can support bodily weight without sagging or breaking. The other issue with this arrangement is that there is little room in front of the front seats for legs.

Figure 1:
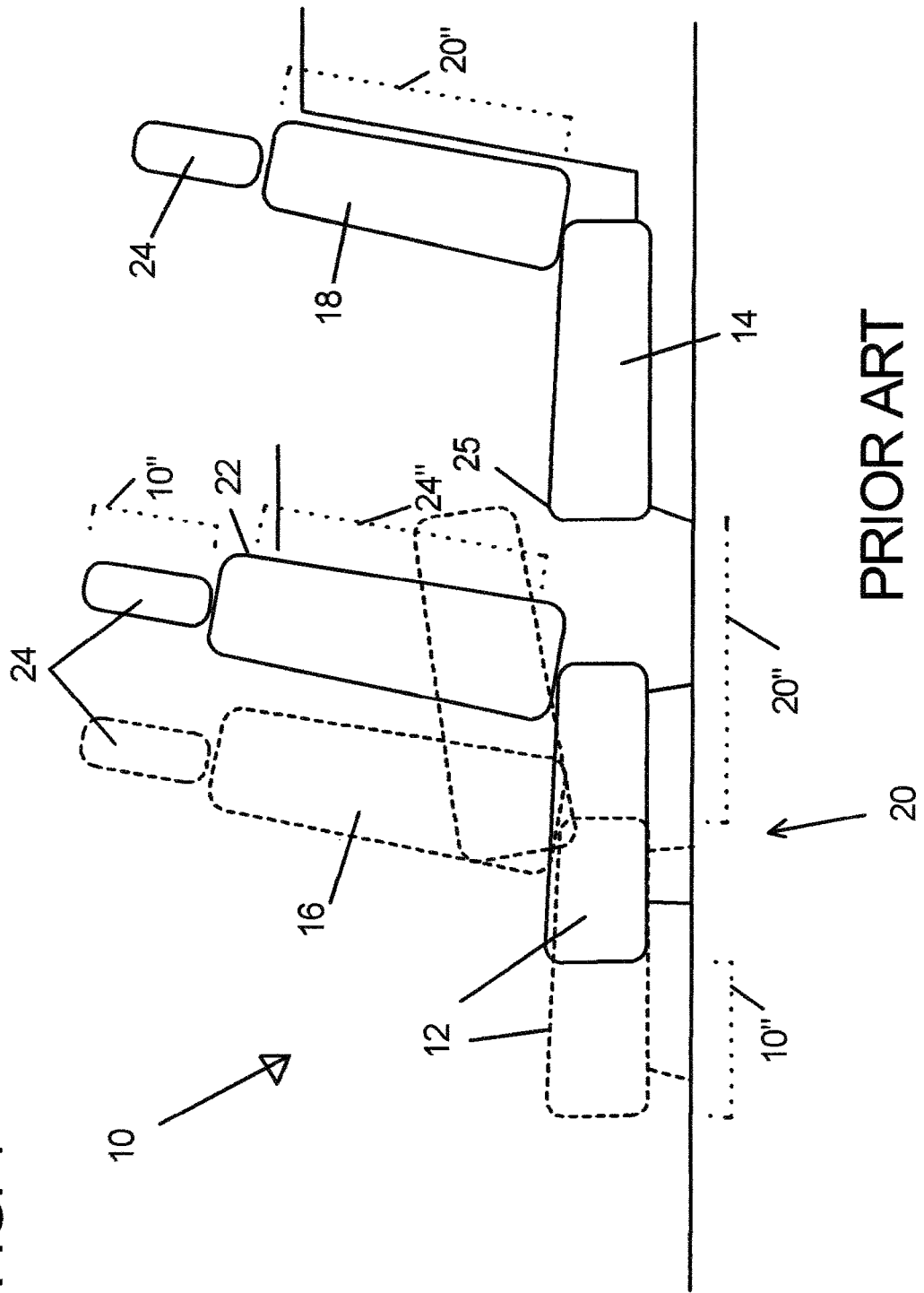
FIG. 1 is a partial side view schematic of the seating arrangement of a compact vehicle.

Referring to FIG. 1, a side view schematic of a typical seating arrangement/system 10 is shown. The outlined items indicate positions of the front seat cushion 12 and front seat back 16 (upright and reclined). The dotted lines indicate lengths of items thereat. When the front seat 20 is slide forward to its most forward position, a top edge/top 22 of the front back seat 16 hits the front edge 25 of the back seat cushion 14, but in this position, when the front seat back 16 is fully reclined, there is essentially no room for legs in front of the seat cushions in the front. Further, standard back seat cushions 14 are difficult to remove quickly and due to its length from door to door, difficult to store in the car or even in the trunk. The measurements shown are approximate and can vary from make and model. The front seat cushion 12 is approximately 22 inches long and can move about 10 inches on a slide rail, not shown. The front seat back 16 is about 24 inches high with a headrest 24 being about 10 inches in height. The headrests 24 are mounted to a pair of rods, not shown, that allow for quick removal of the headrests 24 from the seat back 16. The front seat back 16 is hinged to the front seat cushion 12 along the back portion and is inclined by use of a lever, not shown. The back seat cushion 14 is about 20 inches in length and the back seat back 18 is about 24 inches in height. These figures represent distances in a compact vehicle such as a Honda Civic.

It is asserted that this invention may be used on standard four seat vehicles of different sizes from subcompact to full size.

Figure 2:
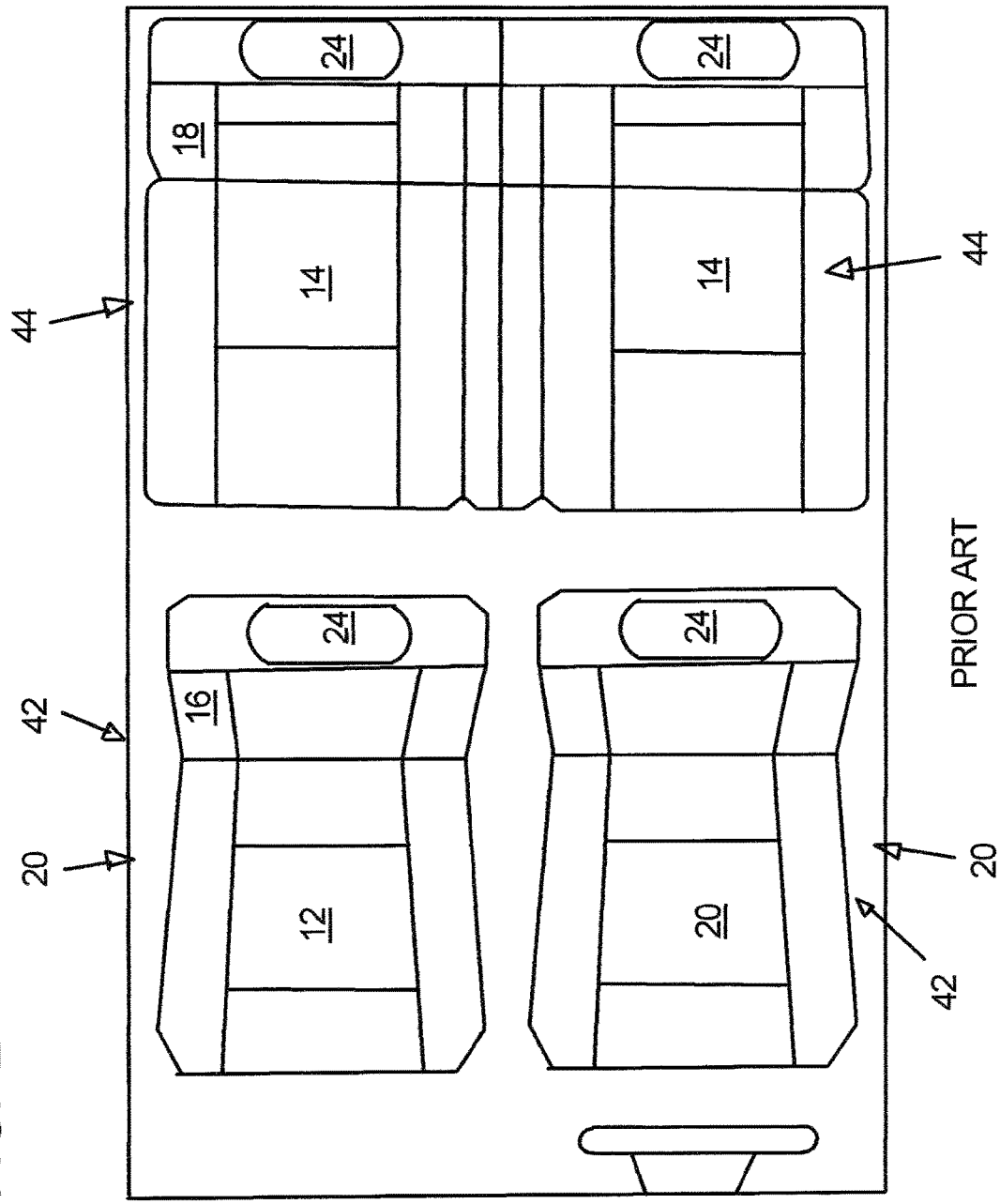
FIG. 2 is a top view schematic of a seating arrangement as shown in FIG. 1.

FIG. 2 is a top view of the seating arrangement as shown in FIG. 1. The front seats are items 42 and the rear seats are items 44. The rear seats 44 are separated and can be individually removed. Normally, a clip on the cushion support frame holds a rod attached to the front of the seat cushion (not shown). To remove, you push backwards on the bottom of the rear seat cushion and that removes the rod from clip. This normally takes considerable force and skill and would be difficult for a woman and/or child. The present invention in one embodiment requires that the seat cushion be easily removed and thus multiple hook and loop devices may be used instead or other appropriate devices as is well known to one skilled in the art.

Figure 3:
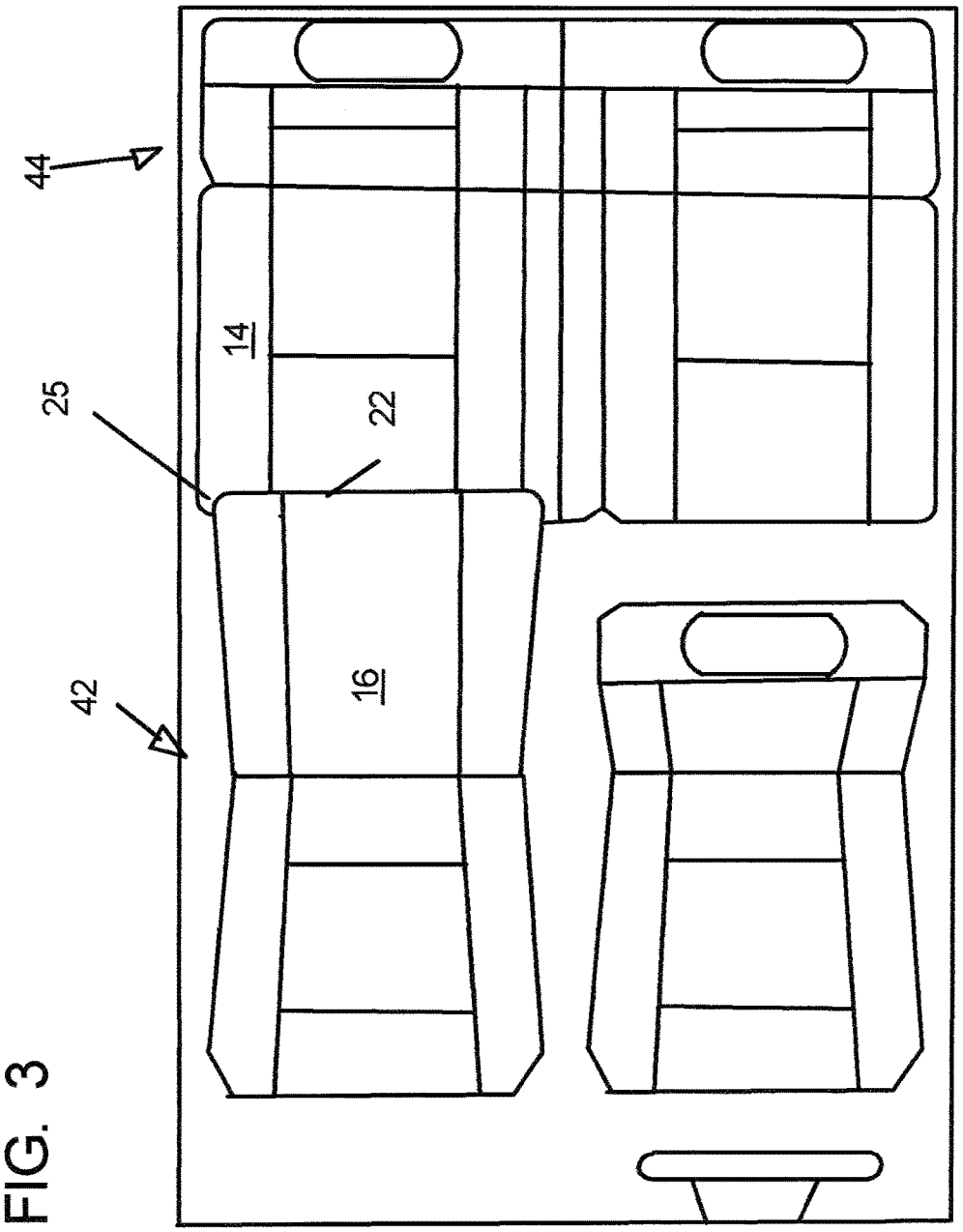
FIG. 3 is a top view schematic of the seating arrangement of FIG. 2 with the passenger front seat back fully reclined onto the rear cushion.

FIG. 3 being prior art illustrates the front passenger seat 42 where the seat back 16 is reclined to the maximum degree so that the top 22 of the seat back 16 touches the front edge 25 of the rear seat cushion 14. This position occurs when the front seat 42 is slide, approximately 10 inches, forward to the maximum distance away from the rear seat 44. A distance of approximately 20 inches occurs between the back edge of the front seat and the front edge of the rear seat.

Figure 4:
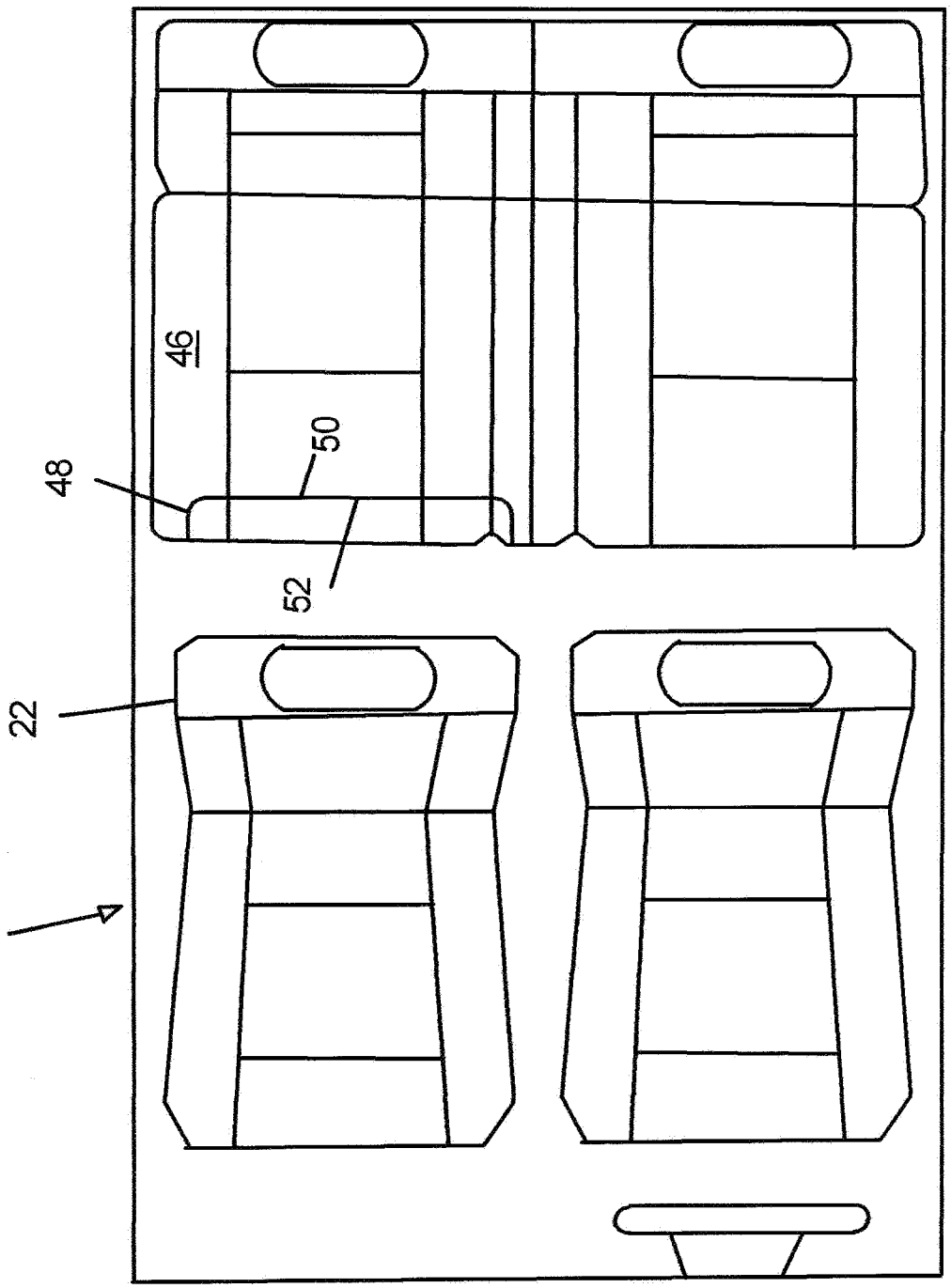
FIG. 4 is a top view schematic of the seating arrangement with the rear seat cushions having removable sections of the present invention.

FIG. 4 illustrates one embodiment of the present invention; a back seat cushion 46 has a removable rear seat cushion section 48 removably attached thereto. This removable section 48 has a back wall 50 with removable attachment means such as hook and loop devices that connect to a front wall 52 of the back seat cushion 46. Straps and other devices known in the art may further assist in holding the removable section 48 in place. When removed, the removable section 48 may be placed in the foot well near the back seats as well as with the headrests 24. The hook and loop devices in this embodiment are attached to the walls of the removable section cushion because the removable section has a minimum length, front to back.

Figure 5:
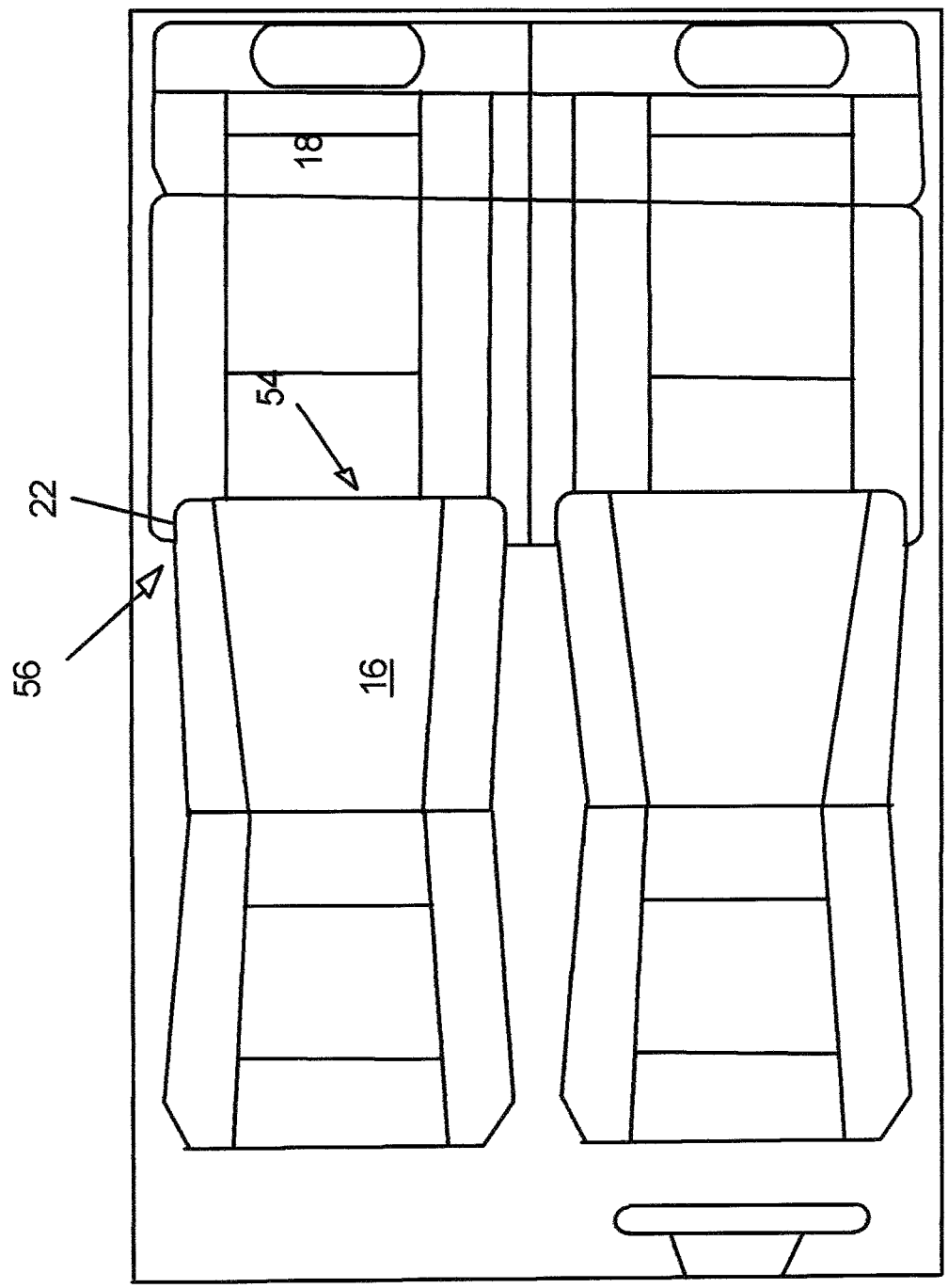
FIG. 5 is a top view schematic of the seating arrangement of FIG. 4 with the rear seat cushions having the removable sections removed with the front seat backs fully reclined into the voids left by the removable sections of the present invention.

FIG. 5 illustrates the seating arrangement/system 10 in the present invention of a second embodiment wherein the removable rear seat cushion section 48 is similarly shaped as the top 22 of the front seat back 16 so that when the front seat back 16 is fully and horizontally reclined, the front seat top 22 fits within a void formed when the removable rear seat cushion section 48 is removed. The top 22 of the front seat back 16 then rests upon a rear cushion support frame 56 (not shown), FIG. 5. See FIG. 7B.

In a first embodiment, the full back seat cushion 14 can be removed and thus the top 22 of the front seat back 16 rests upon the rear cushion support frame 56, not shown. This embodiment is applicable where the front seat back 16 can be horizontally reclined. In this first embodiment, the headrest 24 may be removed. In the second embodiment, the headrest 24 must be removed.

Figure 6:
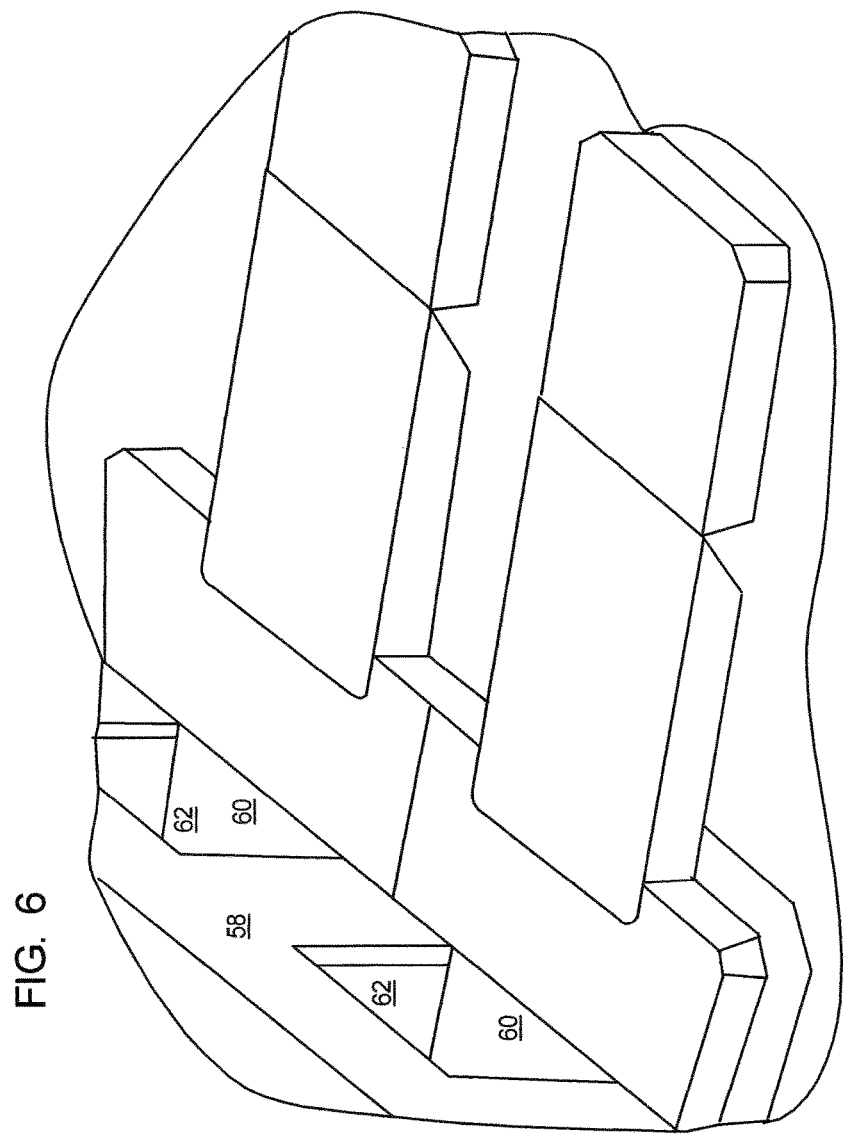
FIG. 6 is a perspective view of the back seating arrangement with the rear seat cushions having the removable sections removed and with the tops of the front seat backs therein with and the rear seat backs also removed to extend the resting space into the trunk of the present invention.

Referring to FIG. 6, one or more removable back seat backs 18 are removable and are attached to a back seat frame 58 where the back seat frame 58 has one or more openings 60 therein for allowing increased resting space into a trunk 62.

As noted above, FIG. 4 illustrates the removable section 48 wherein the front seat 22 is positioned in its most forward position away from the back seat area. As seen therein, the width of the removable section 48 is greater than its length, front to back.

Figure 7A:
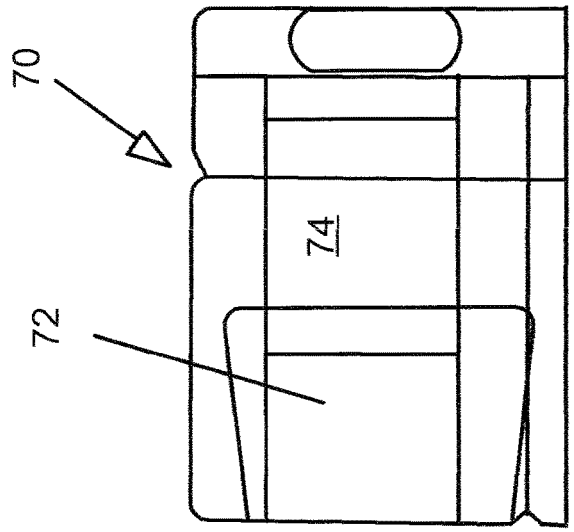
FIGS. 7A and 7B illustrate a rear seat with a removable section where the front seat is located at its most rearward position.
Figure 7B:
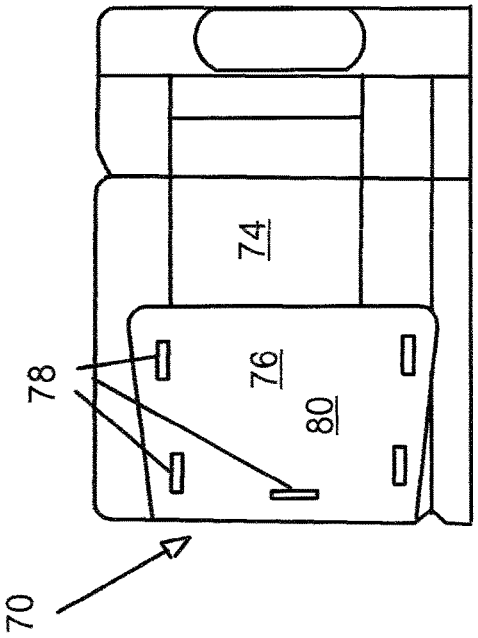
Figure 8A:
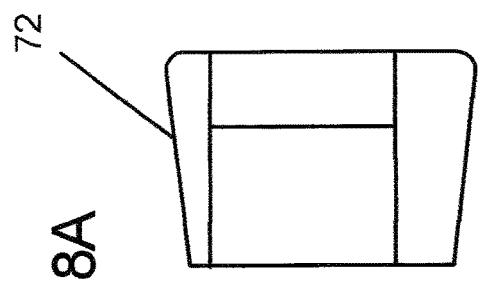
FIGS. 8A and 8B illustrate a removable rear seat cushion section, top view and a side view.
Figure 8B:
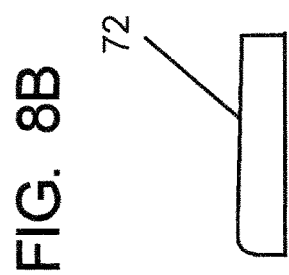

In a still different embodiment, as illustrated in FIGS. 7A and 7B, a rear seat 70, only one shown, has a larger removable rear seat cushion section 72 where its width is about the same as the length because the front seat 20 is located at its most rearward position, closest to the rear seat 70, and thus the front seat back 16 overlaps the rear seat cushion 74 more. As seen in FIG. 7B, the removable section 72 has been removed leaving a void 76 in the rear seat cushion 74. This void 76 has a shape similar to the removable section 72, length, width, wall height, etc. As seen therein, a plurality of hook and loop devices 78 are attached to the cushion support frame 80. This allows for easy removal and replacement of the removable section 72. Other conventional attachment devices are possible such as straps. This embodiment allows for maximum legroom in the area in front of the front seat 20. The manufacturer may offer different embodiments to the consumer. Little leg room but a maximum of sleeping FIGS. 8A and 8B illustrate the removable rear seat cushion section 72, top view in FIG. 8A and a side view in FIG. 8B.

The present invention thus envisions a method of using a seating system for allowing passenger seats in a passenger vehicle to form a relatively flat area for resting. To accomplish this goal, one provides one or more front seats, a front seat back being fully reclining to a substantially horizontal position; one also provides one or more back seats, a back seat cushion being quickly removable by hand, and a removable front seat back support when removed exposes the back seat cushion support so that when the front seat back is fully reclined, it partially rests upon said back seat cushion support.

To increase the amount of resting space, one also provides one or more removable back seat backs where the back seat backs are removably attached to a back seat frame, and the back seat frame has one or more openings therein for allowing increased resting space into the trunk area.

The present invention can be easily further used in passenger vehicles having two rows of back seats, 90 and 92, see FIG. 9, such as in a SUV/van/mini-van where the larger seat backs 82 and 88, having a top 84, for seating two or more persons, can fully recline and be positioned in a void formed by a removable seat cushion 86, the seat cushion may be for separately reclining seat backs or seat backs that are joined into one back. The application to larger vehicles having such seating is shown by an extension of the teachings in FIG. 5. Seat backs 16, two shown, can be jointed to form one larger seat back as would exist in the second row seats in a mini-van. The seats 12, FIG. 2, can also be jointed to form one longer seat for two people as would exist in mini-vans, for example in the second row. The third row seats in a conventional mini-van such as a Chrysler Town and Country (2001 et seq.) are composed of a large bench type seat and a larger seat back hinged thereto. If the front seat(s) can be fully reclined, then the back seat(s) must be matched thereto.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A seating system for allowing passenger seats in a passenger vehicle to form a relatively flat area for resting by a consumer, said seating system comprising:
   one or more front seats, a front seat back being fully reclining to be substantially horizontal;
   one or more back seats, a back seat cushion being removable by hand, a back seat cushion support being under the back seat cushions;
   wherein said front seat back when fully reclined partially rests upon said back seat cushion support.

2. The seating system as defined in claim 1, further comprising a removable headrest upon each of said front and back seat backs.

3. The seating system as defined in claim 1, further comprising:
   one or more removable back seat backs, said back seat backs removably attached to a back seat frame, said back seat frame having an opening therein for allowing increased resting space.

4. A seating system for allowing passenger seats in a passenger vehicle to form a relatively flat area for resting, said seating system comprising:
   one or more seats, a seat back of said one or more seats being fully reclining to be substantially horizontal;
   one or more back seats, one or more back seat cushions having a removable rear seat cushion section located in the front area of said back seat cushion, said removable section being storable in a foot well and being removable by hand, a back seat cushion support frame being exposed when said removable section is removed;
   wherein said seat back when fully reclined partially rests upon said back seat cushion support frame, a top section of said seat back resting on said back seat cushion support frame where said removable section was located.

5. The seating system as defined in claim 4, wherein the one or more seats are front seats.

6. The seating system as defined in claim 5, further including said back seat cushion being split and separable so that each back seat has a removable back seat cushion.

7. The seating system as defined in claim 5, further comprising a removable headrest upon each of said front and back seat backs.

8. The seating system as defined in claim 5, further comprising:

one or more removable back seat backs, said back seat backs removably attached to a back seat frame, said back seat frame having an opening therein for allowing increased resting space.

9. The seating system as defined in claim 5, wherein said seating system is capable of placement in at least one subcompact, compact, mid-size and full size vehicles, wherein said mid-size or full size vehicle may have three rows of seats.

10. A method of using a seating system for allowing passenger seats in a passenger vehicle to form a relatively flat area for resting, said method comprising:
   reclining a seat back of one or more seats, the seat back being fully reclining to be substantially horizontal;
   removing a back seat cushion of one or more back seats, the back seat cushion being removable by hand, a back seat cushion support exposed when said back seat cushion is removed;
   wherein said seat back when fully reclined partially rests upon said back seat cushion support.

11. The method as defined in claim 10, wherein said one or more seats being provided are front seats.

12. The method as defined in claim 11, further comprising the step of:
   removing one or more removable back seat backs, said back seat backs removably attached to a back seat frame, said back seat frame having an opening therein for allowing increased resting space into a trunk area.

13. The method as defined in claim 12, further removing a headrest upon said front seat back when reclining.

14. The seating system as defined in claim 11, further including said back seat cushion being split and separable so that each back seat has a removable back seat cushion.

15. The method as in claim 10, further removing a headrest upon said front seat back when reclining.

16. A method as defined in claim 10, said method further comprising:
   reclining one or more front seat backs of one or more front seats, the front seat back being fully reclining to be substantially horizontal;
   removing one or more back seat cushion sections of one or more back seats, the one or more back seat cushions further including the removable rear seat cushion section located in the front area of said back seat cushion, said removable section being storable in a foot well and being removable by hand, a back seat cushion support exposed when said back seat removable section is removed; and
   reclining said front seat back when fully reclined partially rests upon said back seat cushion support frame, a top section of said front seat back resting on the cushion support frame where said removable section was located.

\* \* \* \* \*